United States Patent [19]
Kramer

[11] Patent Number: 5,865,476
[45] Date of Patent: Feb. 2, 1999

[54] LOCKING MECHANISM FOR A COUPLING

[75] Inventor: Jack Melvin Kramer, Vidalia, Ga.

[73] Assignee: RCF Seals & Couplings, Inc., Vidalia, Ga.

[21] Appl. No.: 782,314

[22] Filed: Jan. 15, 1997

[51] Int. Cl.[6] ................................... F16L 33/02
[52] U.S. Cl. .................. 285/242; 285/252; 24/279
[58] Field of Search ..................... 285/242, 252, 285/253, 255, 406, 407, 420; 24/279, 278, 285, 20 EE, 268; 403/321, 324, 374, 344, 338, 294

[56] References Cited

U.S. PATENT DOCUMENTS

| | | | |
|---|---|---|---|
| 2,264,581 | 12/1941 | Naylor | 285/420 X |
| 2,386,562 | 10/1945 | Mahoney | 285/242 |
| 3,744,825 | 7/1973 | Cooper et al. | 24/279 X |
| 5,261,706 | 11/1993 | Bartholomew | 285/242 |
| 5,323,517 | 6/1994 | Su | 24/20 EE X |

Primary Examiner—Eric K. Nicholson
Assistant Examiner—Gary Grafel
Attorney, Agent, or Firm—Bernstein & Associates, P.C.

[57] ABSTRACT

A duct connector (32) with a flow channel through its center and an increased diameter seal (35) on its end. A compression ring (38) is designed to fit tightly over the duct connector (32) and has an inwardly directed flange (68) on one of its edges which reduces the diameter of the end and thereby prevents the compression ring (38) from sliding past the end of the duct connector (32). A retaining clamp (53) includes two arcs (77, 80) that are pivotally attached and that may be rotated between a circular, closed configuration and an open configuration. The second end of each arc includes a number of open loops (137, 140, and 152) that align when the arcs are in the closed configuration. A sliding locking mechanism (161) is affixed to the arc (77) proximate to the loops (137, 140). The locking mechanism (161) has a prong (170) that passes through the aligned loops (137, 140, and 152) on each arc (77, 80), thereby preventing the arcs (77, 80) from separating.

33 Claims, 9 Drawing Sheets

LOCKING MECHANISM FOR A COUPLING

FIELD OF THE INVENTION

The present invention relates to locking mechanisms and, more particularly, to a locking mechanism for use with couplings that connect two segments of tubing.

BACKGROUND OF THE INVENTION

Locking mechanisms for couplings are used in a wide variety of industrial applications. Wherever separate segments of tubing must be joined together, especially those carrying fluids, a coupling and seal must be used.

Fabric reinforced hose and duct connectors are generally fastened to metal tubing that has a raised, circumferential bead at the end of the tube. This statement holds true for straight or bellows type hose and duct connectors. The flexible connector is able to stretch over the bead and is then secured to the duct by a commercial band clamp. The bead is intended to prevent the duct connector from slipping off of the tube by creating an interference between the band clamp and the bead. By tightening the band clamp around the duct connector, leakage from between the duct connector and the metal tube is supposed to be eliminated. However, when the band clamp is pulled in around the circumference it actually gathers the flexible duct material towards the band clamp screw and creates an axial channel that opens a leak path. Also, in the absence of some sort of bead or raised end on the duct connector itself, the duct can slide out from under the clamp due to the rubber coating of the duct connector taking a compression set.

In addition to the leaking problems, typically the locking mechanism comprises a metal ring with either a bolt type latch or an outwardly pivoting latch. Each of these designs has certain disadvantages associated with them. A bolting latch requires considerable time and manipulative effort to engage. Also, sometimes the bolting must be done in a confined area which makes the work even more difficult. An outwardly pivoting latch makes the coupling cross section substantially larger, and therefore, operating the latch in small openings becomes more difficult.

In view of these difficulties, there is a continuing need for a coupling and seal that eliminates the leakage path associated with existing seals, and there is a continuing need for a locking mechanism for a coupling and seal that is easy to engage and adds a minimum of increased width, while maintaining an effective coupling. A further need is a locking mechanism that can be engaged and disengaged in restricted space environments with one hand.

SUMMARY OF THE INVENTION

The present invention solves the above described problems by providing a coupling and seal that eliminates the leakage path under a variety of atmospheric conditions and by providing a locking mechanism for a coupling that is easy to lock and to unlock and adds a minimal amount of cross-sectional area to the coupling. Generally described, the present invention provides a coupling and seal assembly including a moldable, hollow tubular member, a compression ring, and a retaining clamp.

In a preferred embodiment, the tubular member has a flow channel through its center and a rectangular cross-sectional seal built into its end. The tubular member is used to connect two sections of tubing. The compression ring is a cylindrical member made of metal or other suitable material. The ring is designed to fit tightly over the seal at the end of the tubular member to compress the seal and force the seal radially against the metal tubing. The ring has an inwardly directed annular flange on one side that reduces the diameter thereby preventing the seal from sliding out of the compression ring.

Under vibration, the compression ring may slide off of the seal. In order to prevent the compression ring from moving or sliding off of the seal, a retaining clamp can be added to the coupling system. The retaining clamp includes two arcs that are pivotally connected by a rivet. The first end of one arc has one loop that is connected to a pair of loops on the first end of the other arc by the rivet. Each edge of the arcs has an inwardly directed annular flange that engages with the compression ring when the arcs are secured in a closed configuration. The flanges surround the compression ring and the seal on the tubular member. The second end of one arc includes one open loop extending therefrom, and the second end of the other arc includes two open loops extending therefrom. When the arcs are in the closed configuration, the loops align to receive a latch. The arcs of the retaining clamp may be rotated between a circular, closed configuration and a double arc-shaped open configuration.

A two pronged latch located at the second end of the first arc has a first prong that is permanently and slidingly maintained within a guide, a second prong that is proximate to and slides through the loops, and a connecting member between the prongs. The second prong slides through the aligned loops when the arcs are in the closed position, thereby preventing the arcs from separating. The upper and lower ends of the first prong include angled sections that allow the latch to be engaged or disengaged quickly. Also, the angled section prevents the latch from sliding off of the clamp. In so doing, the angled section acts as a stop and prevents motion of the latch beyond a certain point relative to the guide.

In an alternative embodiment, the latching mechanism comprises a self-locking latch located at the second end of the first arc. The latch is two-pronged with a first prong that is permanently and slidingly engaged with a finger-like projection that is attached to the first arc. The first prong has a bushing permanently attached thereto or formed therein. The bushing has a slot in the back that accepts the finger-like projection. The bushing houses the finger-like projection, a second bushing, and a spring that provides the locking force for the latch. The second bushing fits inside the spring and encircles the finger-like projection.

The second prong slides through the aligned loops when the arcs are in the closed position, thereby preventing the arcs from separating. The upper and lower ends of the latch include angled sections that allow the latch to be engaged and disengaged.

In an alternative embodiment, the hollow coupling member includes an increased diameter seal at both ends that can be sealed by two sets of compression rings and retaining clamps.

Accordingly, it is an object of the present invention to provide an apparatus for coupling and sealing tubing segments.

It is another object of this invention to provide a compression ring configured to create a seal at the coupling joint that eliminates the leak path.

It is a further object of the invention to provide a retaining clamp with a latch mechanism that is both easy to engage and disengage.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENT

Figure 1:
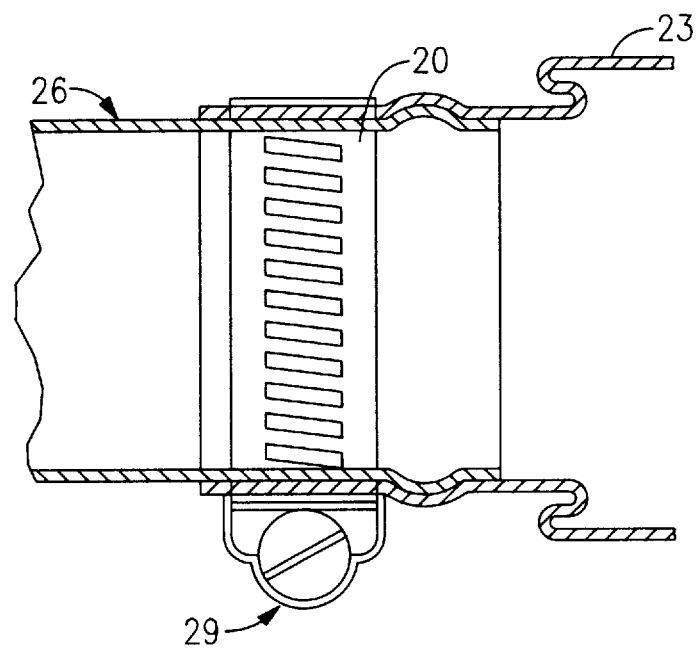
FIG. 1 is a side cut away view of a prior art duct connector and band clamp.

In FIG. 1 a typical prior art band clamp 20 is shown attaching a fabric reinforced duct connector 23 to a beaded metal tube 26. By tightening the band clamp, the space between the duct connector 23 and the tube 26 is supposed to be sealed off. In actuality, when the band clamp 20 is pulled in around the circumference it gathers the flexible duct connector material towards the band clamp screw 29 and creates an axial channel which opens a leak path.

Figure 2:
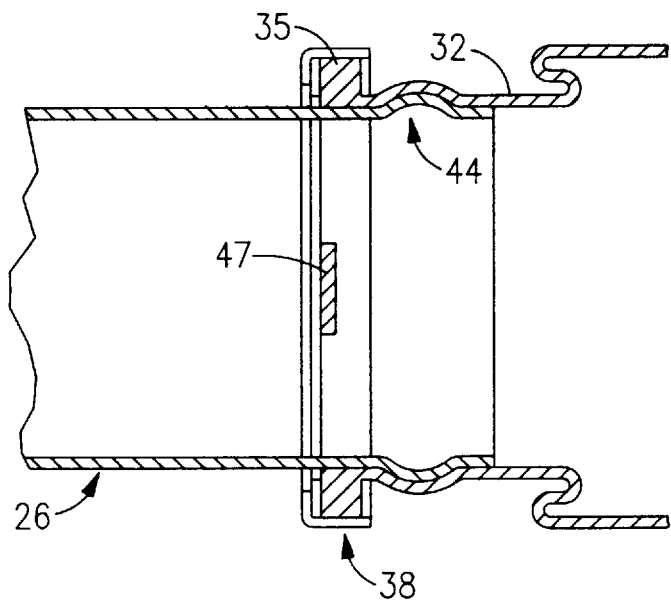
FIG. 2 is a side cut away view of the present invention.

As illustrated in FIGS. 2–8, and initially referring to FIG. 2, the present invention comprises a duct connector 32 with a built in seal 35 and a compression ring 38 that connects to tubing 26 having a beaded or straight wall. For beaded tubing 26 the compression ring 38 is adjacent to the rise of the metal bead 44. When pressure is applied internally the duct connector 32 attempts to climb over the bead 44. The compression ring 38 prevents the duct connector 32 from coming off of the tubing 26 by locking the seal 35 against the slope of the bead 44. The seal 35 becomes tighter as the amount of pressure increases. In order to prevent vibration from causing the compression ring 38 to disengage from the seal 35, a slot 47 is provided near the back of the compression ring 38. The slot 47 fits over the outside diameter of the seal 35, and relieves the compression load of the ring 38 against the seal 35. When internal pressure in the tube 26 is high, the portion of the seal 35 located inside the slot 47 is not subject to the same compressive load as the surrounding portions of the seal 35. As a result, an interference lock is created between the seal 35 inside the slot 47 and the surrounding metal of the compression ring 38. This portion of the seal 35 located inside the slot 47 does not affect the total sealing force and effectively locks the compression ring 38 in place. To remove the compression ring 38, a screw driver tip can force down the extruded material to disengage the compression ring 38.

Figure 3:
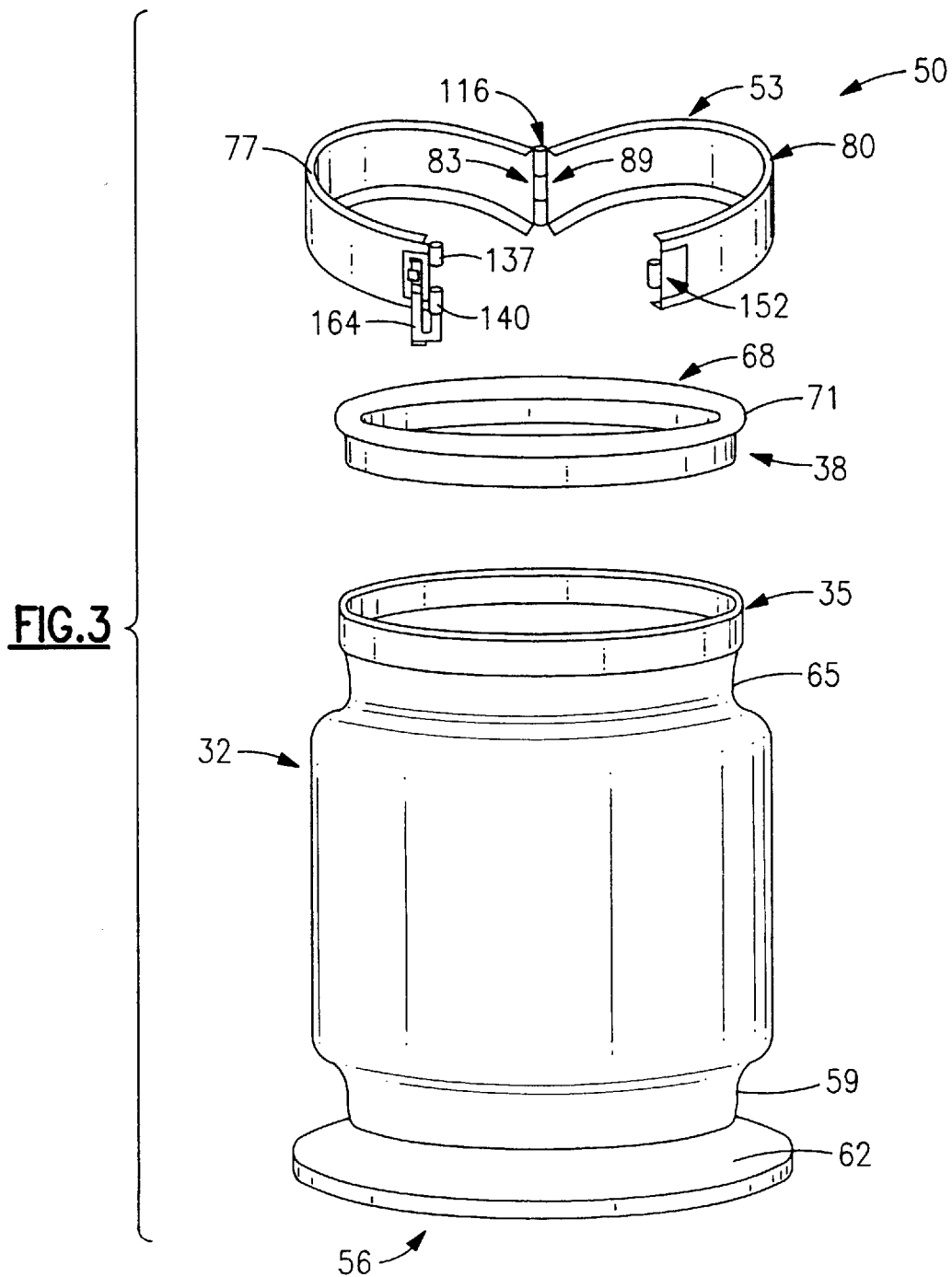
FIG. 3 is a perspective exploded view of an embodiment of the present invention.

Turning to FIG. 3, the present invention provides a flexible coupling 50 that consists generally of a three part assembly comprising a flexible duct connector 32 having a seal 35 at its end, a compression ring 38, and a retaining clamp 53. As shown, the back end 56 of the duct connector 32 has a reduced diameter section 59 and a flange 62 at the end. Other tubular shapes may be substituted for the shape of duct connector 32, including a symmetrical shape.

The duct connector 32 is capable of receiving beaded or straight tubing to form a seal. Duct connector 32 is preferably constructed of a flexible, moldable material such as a polymeric, plastic, composite, or reinforced rubber material. A preferable material for the duct connector is a material known as 328™ composite which is commercially available from RCF Seals & Couplings, Inc. (Vidalia, Ga.). It is commonly used to form a flexible connective joint and seal between two similarly or dissimilarly sized tube segments. Such tubes frequently transport fluids, and the joints need to be fluid tight yet allow for flexion, expansion, and contraction of the tubes with respect to one another due to heat, cold, movement, vibration, rotational, or other effects. The duct connector 32 has a rectangular cross-sectional seal 35 that comprises an increased diameter and increased cross-sectional area relative to the adjacent portion 65 of the duct connector 32. The diameter and axial thickness of the seal 35 are preferably maintained at uniform dimensions across the entire seal.

The compression ring 38 is made of a rigid material that is preferably manufactured from a non-corrosive metal. The inside diameter of the compression ring 38 is sized to fit snugly over the seal 35 of the duct connector 32. The ring 38 has an annular flange 68 that extends from an edge 71 of the ring 38. The annular flange 68 prevents the seal 35 from sliding out of the compression ring 38. For use with beaded metal tubing 26 (shown in FIG. 2), the annular flange 68 must have a large enough diameter to clear the bead 44 (shown in FIG. 2), and preferably allow about an extra one-sixteenth of an inch radial engagement with the side of the seal 35. The compression ring 38 can be mounted permanently behind the bead 44 on the metal tube 26 so that the annular flange 68 could extend to the outside diameter of the metal tube 26 for maximum containment of the seal 35. The resulting compression of the seal 35 by the compression ring 38 forces the seal 35 against the tube 26 radially and forms a tight seal around the tubing 26. The seal that is created is uniform with no circumferential movement and thus no leak path.

For higher pressures where extrusion of the seal 35 under the annular flange 68 of the compression ring 38 may occur, a retaining clamp 53 is preferably added to the duct connector 32.

Figure 4:
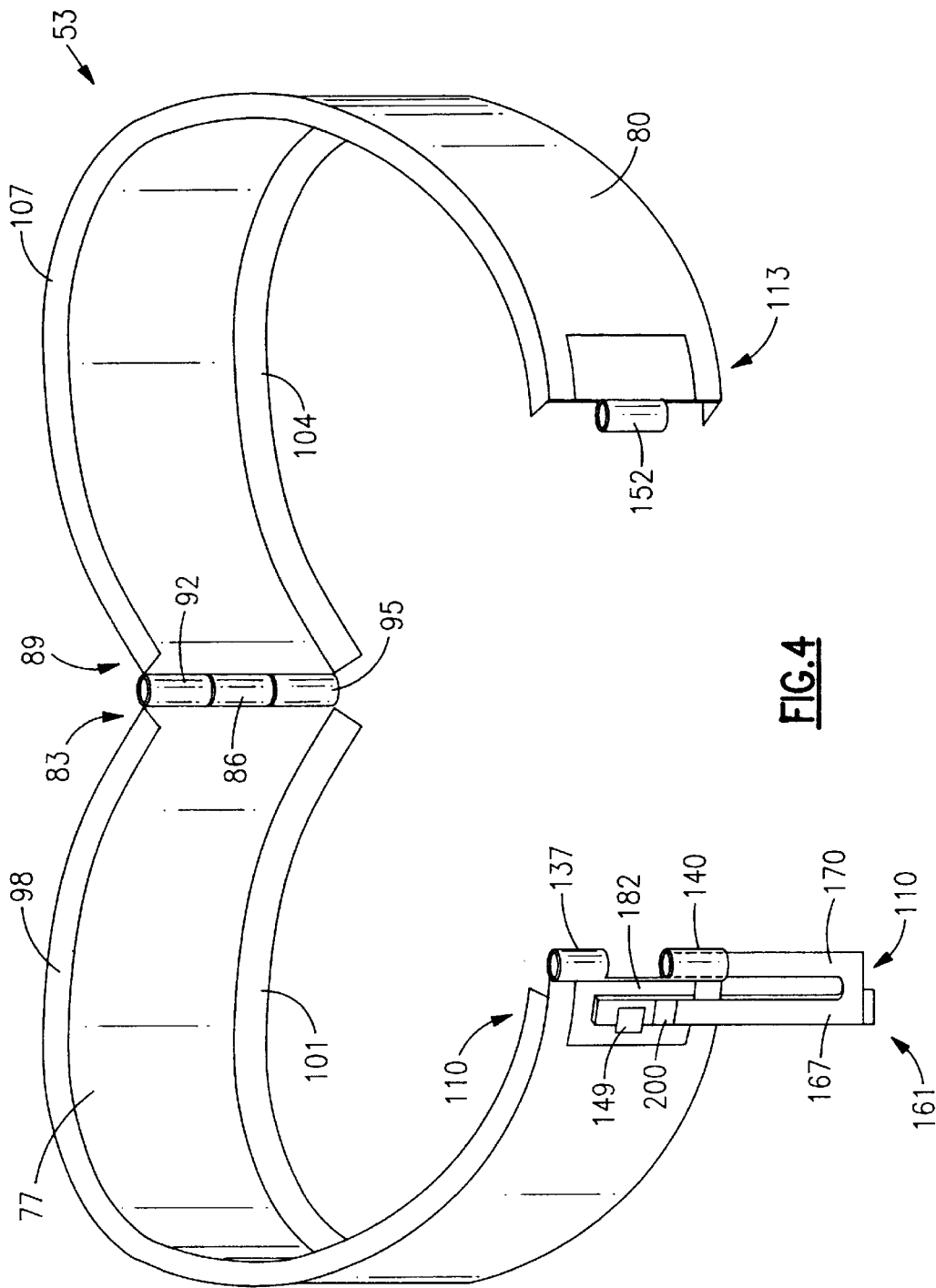
FIG. 4 is a perspective view of the retaining clamp in an open, unlocked position, showing the latch in the retracted position.

Turning to FIG. 4, the retaining clamp 53 consists of two substantially semi-circular arcs 77 and 80. The first end 83 of the first arc 77 has a first loop 86 attached thereto. The first end 89 of the second arc 80 has a first loop 92 and a second loop 95 attached thereto. The loops 92 and 95 align with the loop 86 to form axially aligned loops, when the first ends 83 and 89 of the arcs 77 and 80 are placed in alignment. The first arc 77 has a first annular flange 98 and a second annular flange 101. The second annular flange 101 is preferably wider than the first annular flange 98. The wider flange 101 surrounds the compression ring 38 and the seal 35 completely. Alternatively, both sides of the arcs 77 and 80 could be fitted with the wider flange 101. However, considerations of the weight of the clamp and the cost of material mitigate against the extra width on the first flange 98. Also, the extra width could interfere with the positioning of the clamp 53 which contacts the compression ring 38 and the duct connector 32 and not the tubing 26 itself. The second arc 80 has a first annular flange 104 that is wider than a second annular flange 107. The second end 110 of the first arc 77, and the second end 113 of the second arc 80 rotate freely about the axis established by the connection of the first ends of the arcs 83 and 89.

Figure 5:
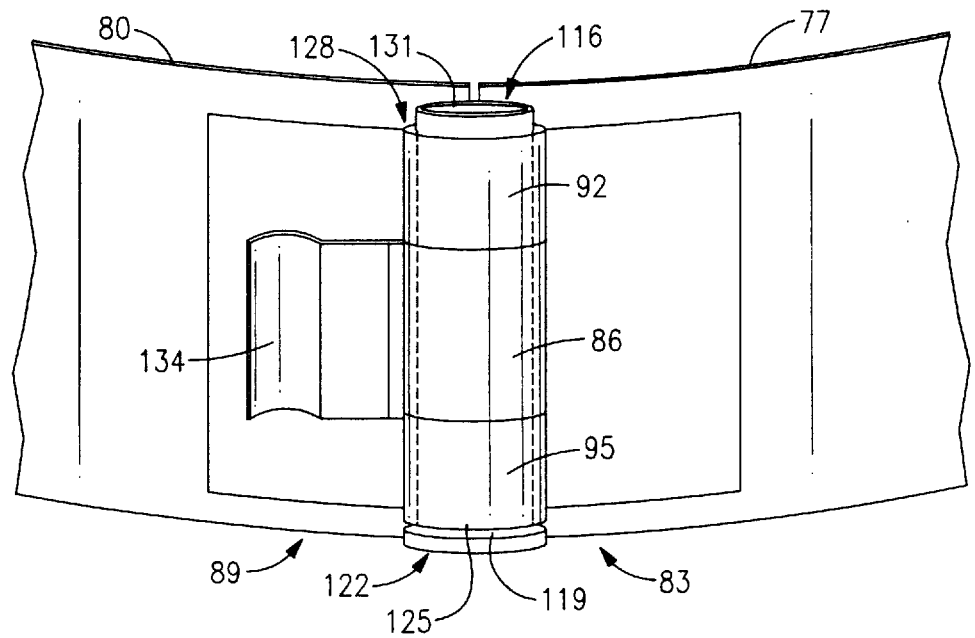
FIG. 5 is a rear view of the arcs showing the interlocking loop and pin configuration as well as the projection.

Referring to FIG. 5, arcs 77 and 80 are pivotally attached by a rivet 116. To join the arcs, loops 86, 92 and 95 are positioned in alignment and the rivet 116 is inserted. The rivet 116 is preferably constructed of a malleable material that has a flat head 119 at an end 122, a middle shank 125, and a plain end 128 opposite the end 122. After the shank 125 is inserted through the loops 86, 92, and 95, the plain end 128 is beaten or pressed down to form a second head 131. The second head 131 prevents the shank 125 from coming out of the loops 86, 92 and 95. Other types of connecting means, such as pins, wires or the like, would be suitable for pivotally attaching the arcs 77 and 80. With the loops 86, 92, and 95 connected by the rivet 116, the arcs 77 and 80 are free to rotate about an axis of rotation established by the rivet 116. A projection 134 may be attached to the first end 89 of the second arc 80 to prevent over-separation of arcs 77 and 80, but is not required. In the alternative, the projection 134 could also be located at the first end 83 of the first arc 77 to perform the same function.

Figure 6:
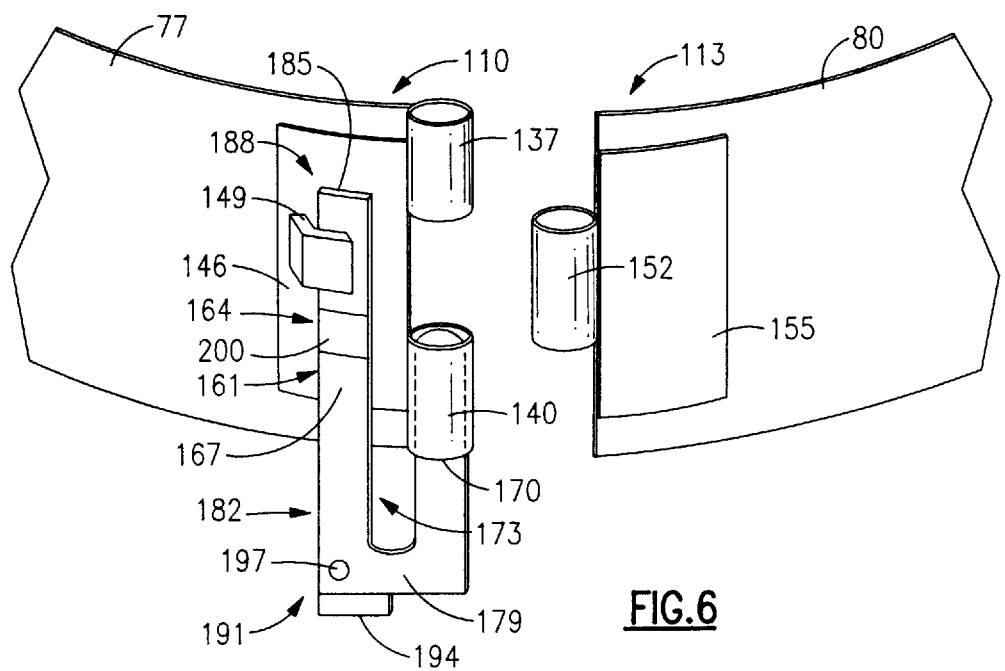
FIG. 6 is a front view showing both the locking mechanism and loops affixed to the retaining clamp arcs with the locking mechanism in the open position.

Turning to FIG. 6, the second end 110 of the first arc 77 has a first loop 137 and a second loop 140. The loops 137 and 140 are preferably formed out metal that is curved at one end to form the loops 137 and 140 and that is rectangular and flat on the other end to form a latch support member 146. The loops 137 and 140 and the latch support member 146 are preferably welded to the arc 77, although other means for permanently attaching the loops 137 and 140 and the latch support member 146 to the arc 77, such as mechanical fasteners, adhesives, or the like could be substituted. The latch support member 146 has an L-shaped guide 149 that extends upward therefrom. The guide 149 extends away from the latch support member 146 along a perpendicular direction from the latch support member 146 and then turns at approximately ninety degrees and extends parallel to the latch support member 146 toward the loops 137 and 140.

Figure 7:
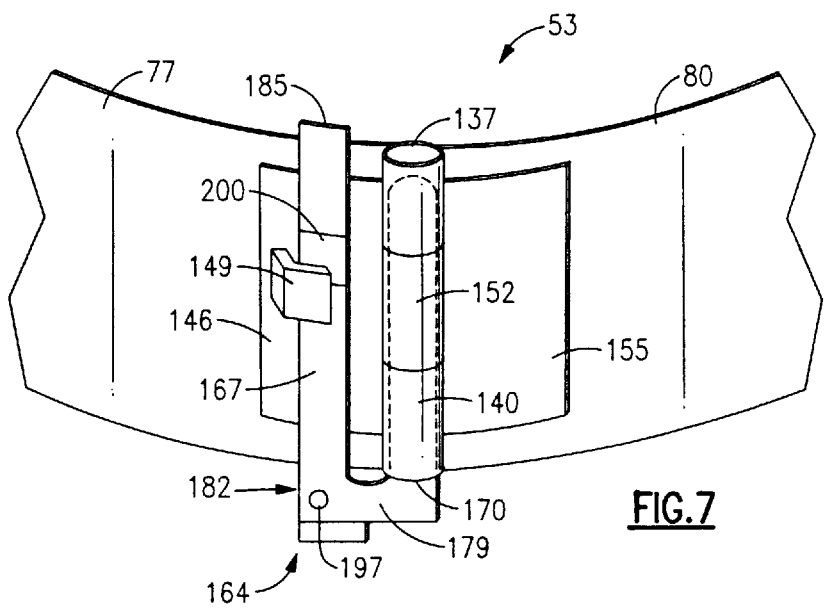
FIG. 7 is a front view showing both the locking mechanism and loops affixed to the retaining clamp arcs in the closed position.

The second end 113 of the second arc 80 has a loop 152 that extends from a latch support member 155 that is welded to the arc 80. Loops 137 and 140 align with loop 152 when the arcs 77 and 80 are brought into the closed position as shown in FIG. 7. The number of loops and the position of the loops on the first or second arc is not critical. The configuration of the loop 152 on the arc 80 fitting in between the two loops 137 and 140 on arc 77 provides a secure engagement. However, any number of loops positioned on either arc 77 or 80 that can be interpositioned to enable a slender member such as a latch to slide through the aligned loops is acceptable.

The locking mechanism 161 comprises a sliding latch 164 to engage loops 137, 140 and 152. The latch 164 is U-shaped and has a first prong 167 and a second prong 170. The first prong 167 and the second prong 170 are preferably formed by cutting a groove 173 into a piece of metal. The groove 173 separates the first prong 167 from the second prong 170. At the end of the groove 173, there is a small amount of remaining material that extends between the two prongs 167 and 170 and forms a connecting member 179. Alternately, the latch 164 can be stamped from a sheet of metal or other rigid material.

The first prong 167 is permanently and slidingly maintained within the guide 149. The outer edge 182 of the first prong 167 is restricted in its direction of travel by the guide 149. A first angled section 185 extends from a first end 188 of the first prong 167 and serves two functions. First, the angled section 185 provides a broader gripping or finger contact surface for manual manipulation of the latch 164. Second, the angled section 185 provides a stop or abutment to prevent the first end 188 of the first prong 167 from sliding past the guide 149. The angled section 185 of the first prong 167 also prevents the latch 164 from sliding far enough for the second prong 170 to completely exit from inside loop 137. A second end 191 of the first prong 167 has a second angled section 194 that extends generally perpendicularly therefrom. The angled section 194 also provides a gripping surface for manual manipulation of the latch 164. An optional small aperture 197 is located on the first prong 167 adjacent to the second end 191. This aperture 197 provides an attachment point for optional safety wire (not shown) to be wound around the front and back of the retaining clamp 53 and the inner base of the seal 35 in a conventional manner as an added security measure. The second prong 170 is positioned inside loop 137 and is capable of extending through loop 140.

The prongs 167 and 170 are designed to slide between a disengaged position and an engaged position with respect to the loops 137, 140, and 152. The disengaged position corresponds to the second prong 170 of the latch 164 being removed from loops 140 and 152 to allow loop 152 to separate from loops 137 and 140.

The surface of the first prong 167 has a slightly raised middle portion to form a protuberance 200. This protuberance 200 provides resistance to the latch 164 as it moves within the guide 149 and between the engaged and the disengaged position, and prevents the latch 164 from unintentionally disengaging.

Turning to FIG. 7, when the latch 164 is in the engaged position, the connecting member 179 is brought into contact with loop 137, and the prongs 167 and 170 on the latch 164 cannot enter the loops 137, 140 and 152 any farther. In this position, the second prong 170 extends through loops 137, 140 and 152 to engage the two arcs 77 and 80 of the retaining clamp 53.

Figure 8:
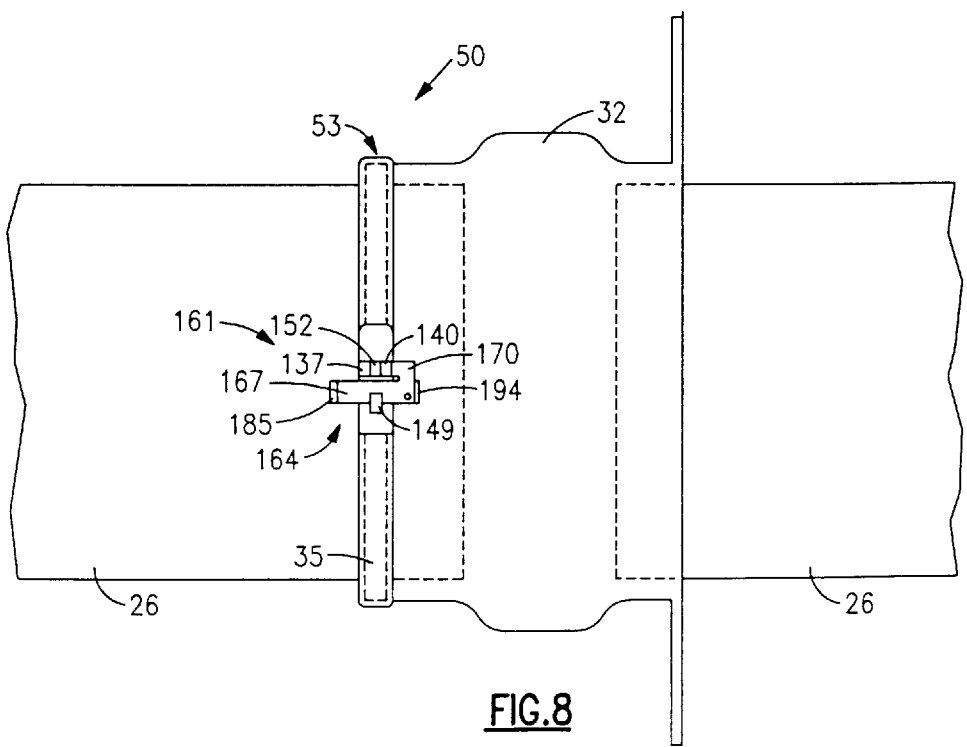
FIG. 8 is a side view of the present invention attached to two sections of tubing.

Referring to FIG. 8 the retaining clamp 53 in operation maintains the compression ring 38 in position on the seal 35 (not shown). Without the retaining clamp 53, movements and vibration of the joint could cause the compression ring 38 to come off of the duct connector 32. Also, high pressure could cause the seal 35 to extrude under the annular flange 68. The coupling 50 joins two sections of tubing 26 to form a liquid tight seal.

The latching mechanism 161 and the loops 137, 140 and 152 of the present invention have been described in connection with a specific retaining clamp 53. However, the latching mechanism 161 could be used in any application where a reduced cross-sectional area latch would be desirable. To use the latching mechanism 161 in another application, the latch support members 146 and 155, the contiguous loops 137, 140, and 152, and the latch 164 would be attached to a different structure than the retaining clamp 53.

Figure 9:
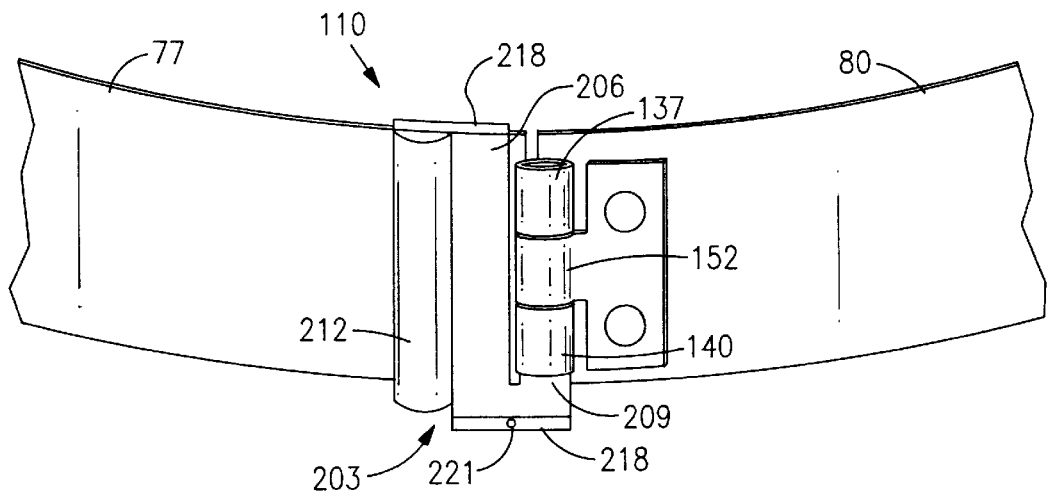
FIG. 9 is a perspective view of an alternate embodiment of the latching mechanism of the present invention.
Figure 10:
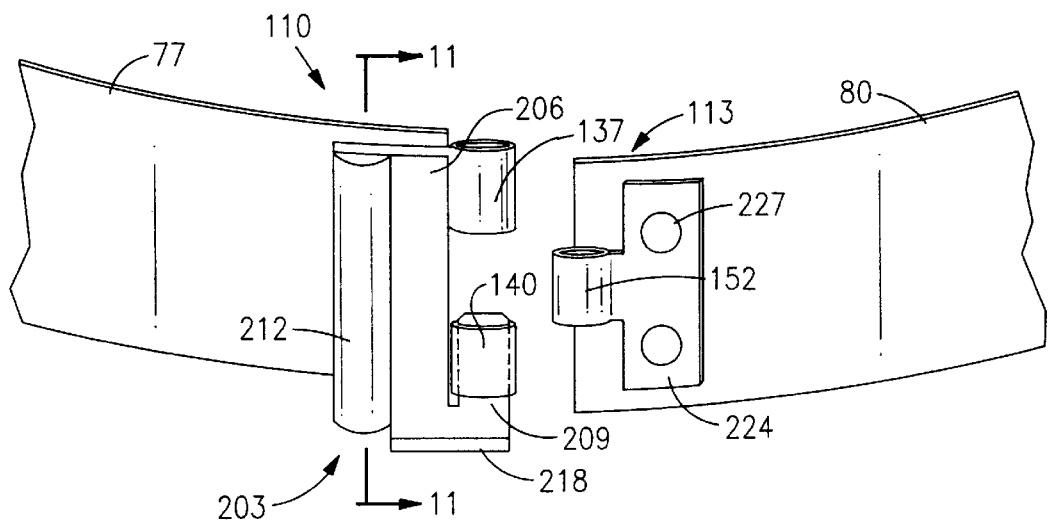
FIG. 10 is a perspective view of the latching mechanism of FIG. 9 in the open position.
Figure 11:
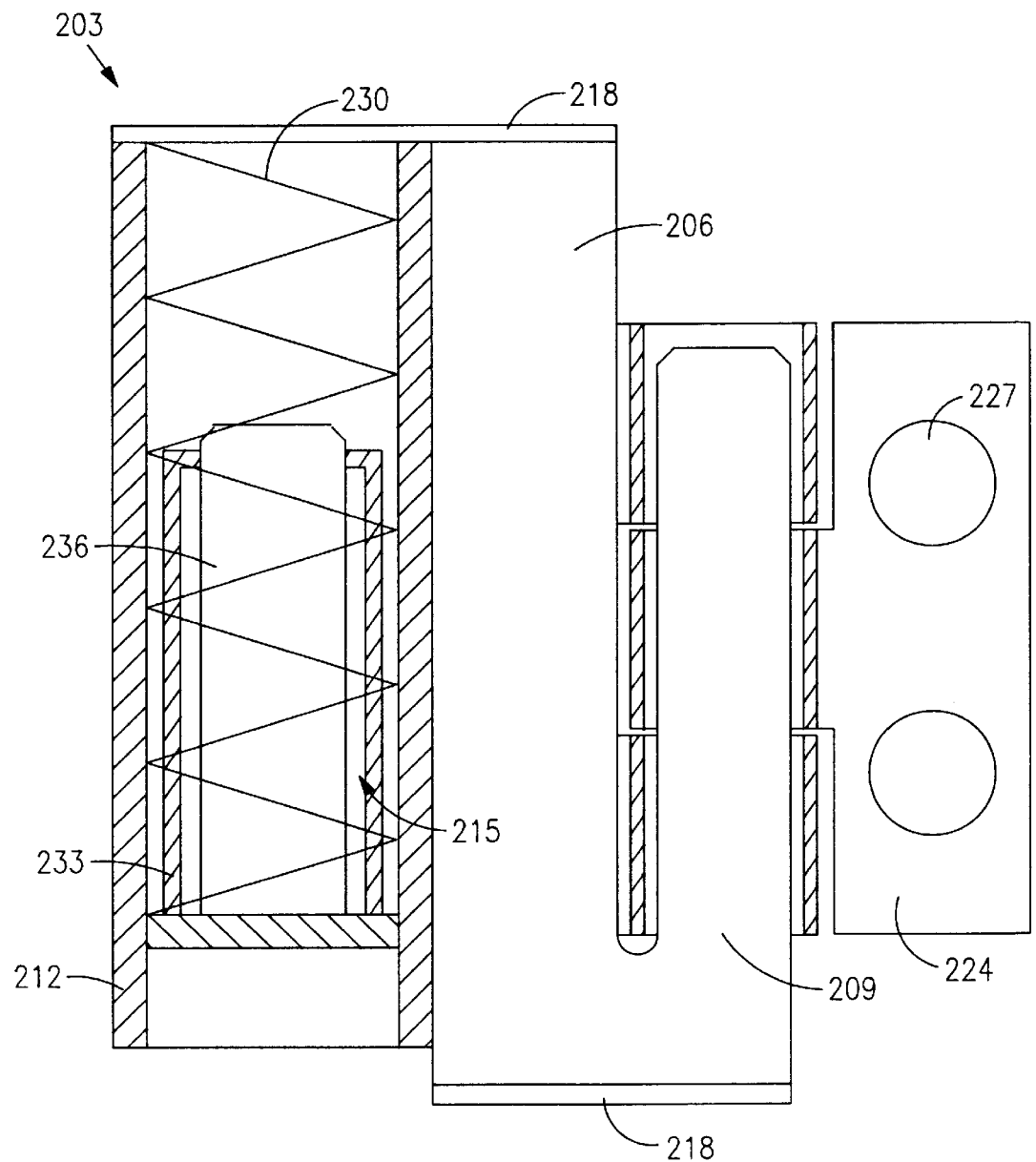
FIG. 11 is a sectional view taken along lines 11—11 of FIG. 10.

An alternate embodiment of the latching mechanism of the present invention is shown in FIGS. 9–11. A self-locking latch 203 is positioned at the second end 110 of the first arc 77. The latch 203 has a first prong 206 and a second prong 209. The first prong 206 has a bushing 212. The bushing 212 may be attached to the first prong 206 or integrally formed therein. The back of the bushing 212 preferably has a slot 215 as shown in FIG. 11. The slot 215 extends along the length of the bushing 212. The second prong 209 is a slender elongated member sized to fit through loops 137, 140 and 152. The top and bottom of the latch 203 have an angled section 218 that provides a gripping surface for manual manipulation of the latch 203. The angled section 218 may be equipped with an aperture 221 for wrapping safety wire around the latch 203 for an additional layer of protection, as described above.

FIG. 10 shows the latch 203 in the retracted disengaged position. The loop 152 is attached to the second end 113 of the second arc 80. The loop 152 may extend from a base portion 224 that is attached to the arc 80 by rivets 227. Other methods for attaching the base portion to the arc 80 would be suitable such as gluing, attaching by other mechanical fasteners, or the like. The latch 203 slides laterally with respect to the second end 110 of the first arc 77. The bushing 212 is mounted to the latch 203 and slides therewith.

FIG. 11 shows the inside of bushing 212 comprising a spring 230 and a second bushing 233. A finger-like projection 236 extends through the slot 215 in the back of the bushing 212. The projection 236 is fixedly attached to the second end 110 of the first arc 77. The latch 203 attaches to the second end 110 of the arc 77 by insertion of the projection 236 through the slot 215 in the bushing 212. The latch 203 slides along a path determined by the projection 236. The projection 236 is preferably longer than the slot 215, and, once the projection 236 is positioned within the slot 215, the latch 203 is connected to the arc 77.

The spring 230 provides the locking force that holds the second prong 209 in the extended position where it is extended through the aligned loops 137, 140 and 152. The second bushing 233 encircles the projection 236 with a tight tolerance circumscribing the movement of the latch 203. Without the second bushing 233, the latch 203 does not slide in a uniform lateral plane perpendicular to the second end 110 of the arc 77 and tends to rotate relative to the arc 77.

Retracting the second prong 209 from the loops 137, 140 and 152 compresses the spring 230. Accordingly, the latch 203 is biased in the closed position by the spring 230.

Figure 12:
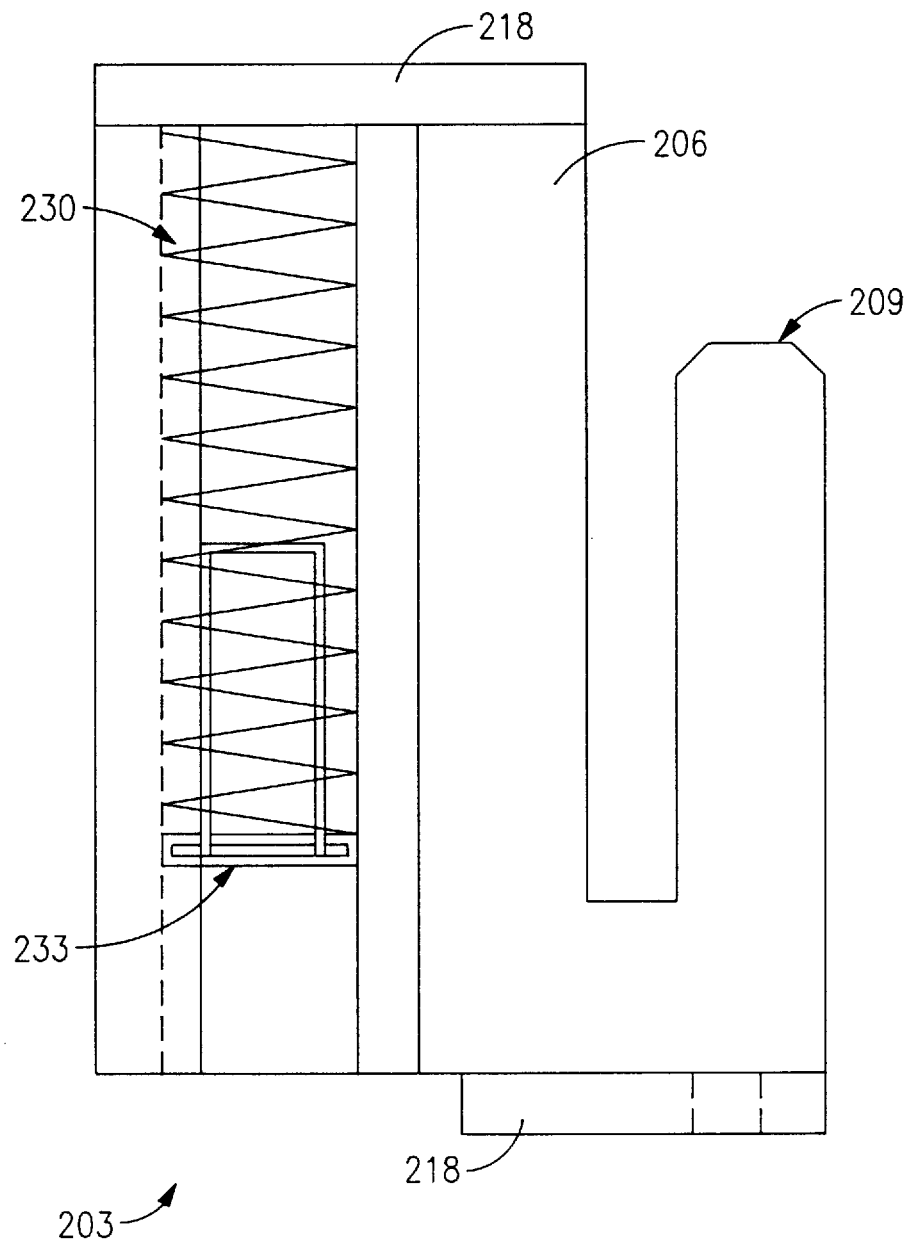
FIG. 12 is a top plan view of the self locking latch of FIG. 9.

FIG. 12 shows a detail of the latch 203. The second prong 209 is a slender, elongated member. The top and bottom of the latch 203 are equipped with an angled section 218 that provides a gripping surface for manual manipulation of the latch 203. The spring 230 and the second bushing 233 are nested inside the bushing 212. The slot 215 (shown in FIG. 11) in the back of the bushing 212 accepts the projection 236 that is attached to the second end 110 of the arc 77.

Figure 13:
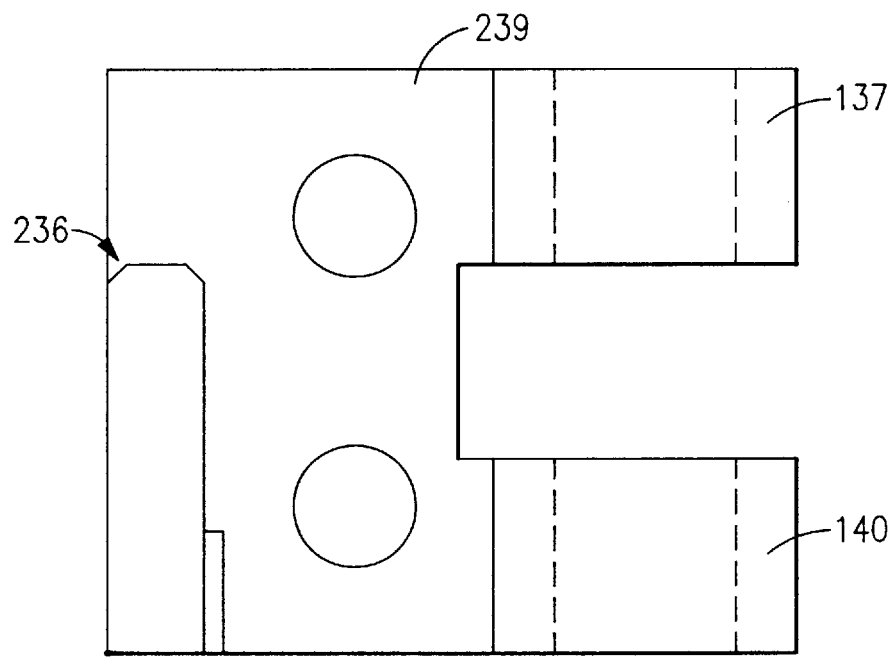
FIG. 13 is a top plan view of the finger like projection and loops that attach to the second end of the first arc.

FIG. 13 shows a detail of the base portion 239 that attaches to the second end 110 of the arc 77. The loops 137 and 140 are formed integrally with the base portion 239 (best shown in FIG. 14). The base portion 239 is attached to the arc 77 by a known mechanical process such as welding, gluing, mechanical fasteners such as screws or rivets or the like. The projection 236 may be attached to the base portion 239 or integrally formed therein.

Figure 14:
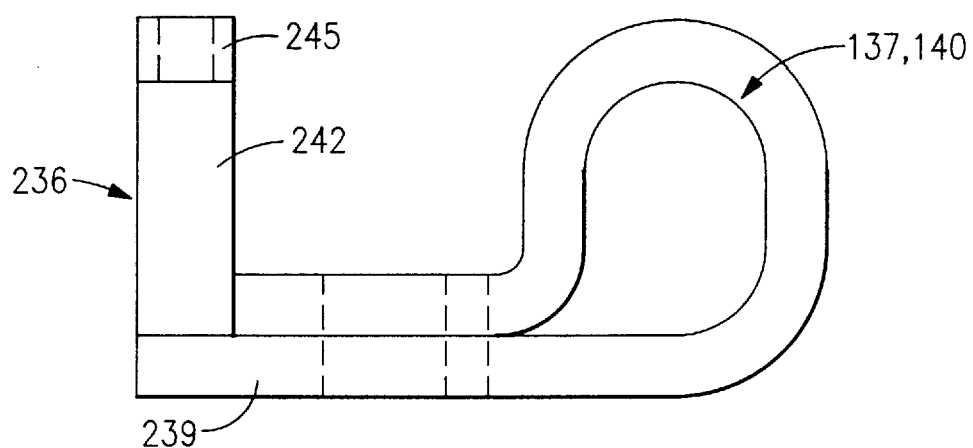
FIG. 14 is a side elevation view of the finger like projection and loops of FIG. 13.

As shown in FIG. 14, a portion 242 of the projection 236 extends substantially perpendicular from the base portion 239. Another portion 245 of the projection 236 extends substantially parallel to the base portion 239. A curved section 248 (not shown) connects the substantially perpendicular and the substantially parallel sections 242 and 245, respectively. The projection 236 preferably extends a distance away from the base portion 239 in order to allow space for the latch 203 to mount on the projection 236 and have room to move along the path defined by the projection 236 without impinging on the base portion 239. The parallel portion 245 of the projection 236 defines the travel of the latch 203 with respect to the arc 77. As shown, the loops 137 and 140 may be constructed integrally with the base portion 239.

Accordingly, the device of the present invention offers significant advantages over the prior art devices by providing a seal and coupling that eliminates the leak path and by providing a simple locking mechanism that adds a small amount of additional diameter to a coupling. The addition of a small additional cross-sectional area applies to the open position, the closed position, and the transition from the open to the closed position. In order to do so, the device of the present invention provides a latching mechanism that operates in one plane parallel to the tubing. The smaller diameter achieved by the device offers a significant advantage for use of the coupling in space restricted environments.

Also, the device requires a minimum of manipulative effort to engage and disengage the latch. The device can be engaged and disengaged with one hand. Therefore, the device is easier to use than conventional mechanisms in areas with space restrictions.

Further, the coupling and seal of the present invention provide a sliding seal which accepts thermal expansion.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A coupling for use with tubing, comprising:

a duct connector having an inside dimension slightly larger than the tubing and having at least one lip disposed on at least one end of the duct connector, the lip having an increased diameter cross section relative to the duct connector; and at least one compression ring sized to fit snugly over the lip so that the lip is maintained in compression, the compression ring having a slot defined therein, said compression ring having a sliding latch mechanism comprising:

a first latch support member having at least one first loop;

a second latch support member having at least one second loop, the at least one second loop alignable with the at least one first loop on the first latch member to form a set of axially aligned loops;

a guide extending from the first latch support member, the guide having a first section and a second section, the first section extending substantially perpendicular to the first latch support member and the second section extending substantially parallel to the first latch support member; and a U-shaped latch slidingly engageable with the first latch support member, the latch having a first prong, a second prong, and a connecting member disposed between the first prong and the second prong, the first prong being disposed between the at least one first loop on the first latch support member and the guide, the second prong attached to the connecting member, the second prong sized to fit through the set of axially aligned loops so that the at least one first loop and the at least one second loop are maintained in axial alignment when the second prong of the latch is inserted through the at least one first loop and the at least one second loop during engagement of the latch.

2. A sliding latch mechanism, comprising:

a first latch support member having at least one first loop;

a second latch support member having at least one second loop, the at least one second loop alignable with the at least one first loop on the first latch member to form a set of axially aligned loops;

a guide extending from the first latch support member, the guide having a first section and a second section, the first section extending substantially perpendicular to the first latch support member and the second section extending substantially parallel to the first latch support member; and a U-shaped latch slidingly engageable with the first latch support member, the latch having a first prong, a second prong, and a connecting member disposed between the first prong and the second prong, the first prong being disposed between the at least one first loop on the first latch support member and the guide, the second prong attached to the connecting member, the second prong sized to fit through the set of axially aligned loops so that the at least one first loop and the at least one second loop are maintained in axial alignment when the second prong of the latch is inserted through the at least one first loop and the at least one second loop during engagement of the latch.

3. The sliding latch mechanism of claim 2, wherein the first prong has a protuberance disposed adjacent to the guide and capable of being engaged with the second section of the guide so that the first prong does not inadvertently slide from an engaged to a disengaged position.

4. The sliding latch mechanism of claim 2, further comprising at least one angled section extending from at least one end of the U-shaped latch.

5. The sliding latch mechanism of claim 2, wherein the guide is L-shaped.

6. The sliding latch mechanism of claim 2, wherein the first prong has an aperture located therein.

7. A retaining clamp, comprising:

a first arc having a first end and a second end;

a second arc having a first end and a second end, the first end of the second arc pivotally attached to the first end of the first arc by a hinge means;

at least one first loop attached to the second end of the first arc;

at least one second loop attached to the second end of the second arc, the at least one second loop alignable with the at least one first loop on the first arc to form a set of axially aligned loops;

a guide attached to the second end of the first arc, the guide having a first section substantially perpendicular to the second end of the first arc and having a second section substantially parallel to the second end of the first arc; and a U-shaped latch slidingly engageable with a first latch support member, the latch having a first prong, a second prong, and a connecting member disposed between the first prong and the second prong, the first prong being disposed between the at least one first loop and the guide, the second prong attached to the connecting member, the second prong sized to fit through the set of axially aligned loops so that the at least one first loop and the at least one second loop are maintained in axial alignment when the second prong of the latch is inserted through the at least one first loop and the at least one second loop during engagement of the latch.

8. The retaining clamp of claim 7, wherein the first prong has a protuberance disposed adjacent to the guide and capable of being engaged with the second section of the guide so that the first prong does not inadvertently slide from an engaged to a disengaged position.

9. The retaining clamp of claim 7, wherein the first end of the second arc has a projection extending therefrom and disposed adjacent to the first end of the first arc.

10. The retaining clamp of claim 7, wherein the first end of the first arc has a projection extending therefrom and disposed adjacent to the first end of the second arc.

11. The retaining clamp of claim 7, wherein the first prong has an aperture located therein.

12. The retaining clamp of claim 7, wherein the first arc is substantially semi-circular.

13. The retaining clamp of claim 7, wherein the second arc is substantially semi-circular.

14. The retaining clamp of claim 7, wherein the first arc has a first edge having a first annular flange extending therefrom and a second edge having a second annular flange extending therefrom.

15. The retaining clamp of claim 14, wherein the second annular flange is wider than the first annular flange.

16. The retaining clamp of claim 7, wherein the second arc has a first edge having a first annular flange extending therefrom and a second edge having a second annular flange extending therefrom.

17. The retaining clamp of claim 16, wherein the second annular flange is wider than the first annular flange.

18. A coupling comprising:

a duct connector having at least one lip disposed on at least one end, the lip having a rectangular cross section and an increased diameter relative to a tubular member;

at least one compression ring positioned on the lip of the duct connector, the compression ring sized to fit snugly over the lip so that the lip is maintained in compression;

a retaining clamp surrounding the compression ring, the retaining clamp having a first arc and a second arc, the first arc having a first end and a second end, the second arc having a first end and second end, the first end of the first arc pivotally attached to the first end of the second arc by hinge means, at least one first loop attached to the second end of the first arc;

at least one second loop attached to the second end of the second arc, the at least one first loop alignable with the at least one second loop to form a set of axially aligned loops; and latch means for connecting the first arc to the second arc to surround the compression ring.

19. The coupling of claim 18, wherein the latch means comprises:

a guide attached to the second end of the first arc, the guide having a first section substantially perpendicular to the second end of the first arc and having a second section substantially parallel to the second end of the first arc; and a U-shaped latch slidingly engageable with a first latch support member, the latch having a first prong, a second prong, and a connecting member disposed between the first prong and the second prong, the first prong being disposed between the at least one first loop and the guide, the second prong attached to the connecting member, the second prong sized to fit through the set of axially aligned loops so that the at least one first loop and the at least one second loop are maintained in axial alignment when the second prong of the latch is inserted through the at least one first loop and the at least one second loop during engagement of the latch.

20. The coupling of claim 19, wherein the first prong has a protuberance disposed adjacent to the guide and capable of being engaged with the second section of the guide so that the first prong does not inadvertently slide from an engaged to a disengaged position.

21. The coupling of claim 19, wherein the compression ring has an edge with an annular flange extending inward therefrom.

22. The coupling of claim 19, wherein the second arc has a projection extending therefrom and disposed adjacent to the first end of the second arc.

23. The coupling of claim 19, wherein the first arc has a projection extending therefrom and disposed adjacent to the first end of the first arc.

24. The coupling of claim 19, wherein the guide is L-shaped.

25. The coupling of claim 19, further comprising at least one angled section attached to each end of the U-shaped latch so that the U-shaped latch has a gripping surface.

26. The sliding latch of claim 19, wherein the first prong has an aperture located therein.

27. The retaining clamp of claim 19, wherein the first arc is substantially semi-circular.

28. The retaining clamp of claim 19, wherein the second arc is substantially semi-circular.

29. The coupling of claim 19, wherein the first arc is a ring shaped member having a first edge and a second edge, the first edge having first annular flange extending therefrom and the second edge having a second annular flange extending therefrom.

30. The coupling of claim 29, wherein the second annular flange is wider than the first annular flange.

31. The coupling of claim 19, wherein the second arc is a ring shaped member having a first edge and a second edge, the first edge having a first annular flange extending therefrom and the second edge having a second annular flange extending therefrom.

32. The coupling of claim 31, wherein the second annular flange is wider than the first annular flange.

33. The coupling of claim 18, wherein the latch means further comprises:

a projection attached to and extending from the second end of the first arc;

a self locking latch having a first prong and a second prong, the first prong having a first bushing attached thereto, the bushing having a slot defined therein and having a second bushing nested therein, the first bushing receiving the projection through the slot so that the latch is attached to the first arc and slides relative to the first arc along a path defined by the projection, the second prong sized to fit through the first and second loops to prevent the arcs from separating; and a spring disposed inside the first bushing and surrounding the second bushing, whereby the spring biases the latch in a closed position where the second prong extends through the first and second loops.

* * * * *